United States Patent [19]

Williams

[11] 3,916,473

[45] Nov. 4, 1975

[54] WIPER FOR WINDSHIELDS

[75] Inventor: Zelmer L. Williams, Issaquah, Wash.

[73] Assignee: H.A.S. Investments, Inc. (Entire), Lacey, Wash.

[22] Filed: Feb. 25, 1974

[21] Appl. No.: 445,224

[52] U.S. Cl. ........ 15/250.04; 15/250.35; 15/250.39; 15/250.42
[51] Int. Cl.$^2$............................................ B60S 1/46
[58] Field of Search........ 15/250.04, 250.07, 250.08, 15/250.31, 250.42

[56] References Cited
UNITED STATES PATENTS

| | | | |
|---|---|---|---|
| 1,857,419 | 5/1932 | Williams | 15/250.04 |
| 1,888,326 | 11/1932 | Mullen | 15/250.04 |
| 2,245,244 | 6/1941 | Zaiger | 15/250.35 |
| 2,691,790 | 10/1954 | O'Shei | 15/250.35 |
| 3,143,753 | 8/1964 | Torelv | 15/250.04 |
| 3,405,420 | 10/1968 | Smithers et al. | 15/250.35 |
| 3,440,679 | 4/1969 | Druseikis | 15/250.04 |
| 3,600,738 | 8/1971 | Riester | 15/250.34 |

FOREIGN PATENTS OR APPLICATIONS

| | | | |
|---|---|---|---|
| 436,548 | 10/1935 | United Kingdom | 15/250.04 |
| 544,311 | 1/1956 | Belgium | 15/250.04 |
| 801,989 | 9/1958 | United Kingdom | 15/250.04 |

*Primary Examiner*—Peter Feldman
*Attorney, Agent, or Firm*—Clarence A. O'Brien; Harvey B. Jacobson

[57] ABSTRACT

A windshield wiper assembly having an arm assembly mountable on a conventional wiper arm support head. A blade assembly mounted on the arm assembly has a longitudinal blade provided with a longitudinal groove forming a gutter in cooperation with an adjacent portion of a base in which the blade is mounted. An aperture provided in the blade base permits a fluid supply hose to communicate with the groove and feed a fluid thereto for passage onto an associated windshield. The blade assembly base is mounted on the arm assembly by a bridge having a jog arranged adjacent the aperture in the blade base for facilitating placement of the hose.

7 Claims, 8 Drawing Figures

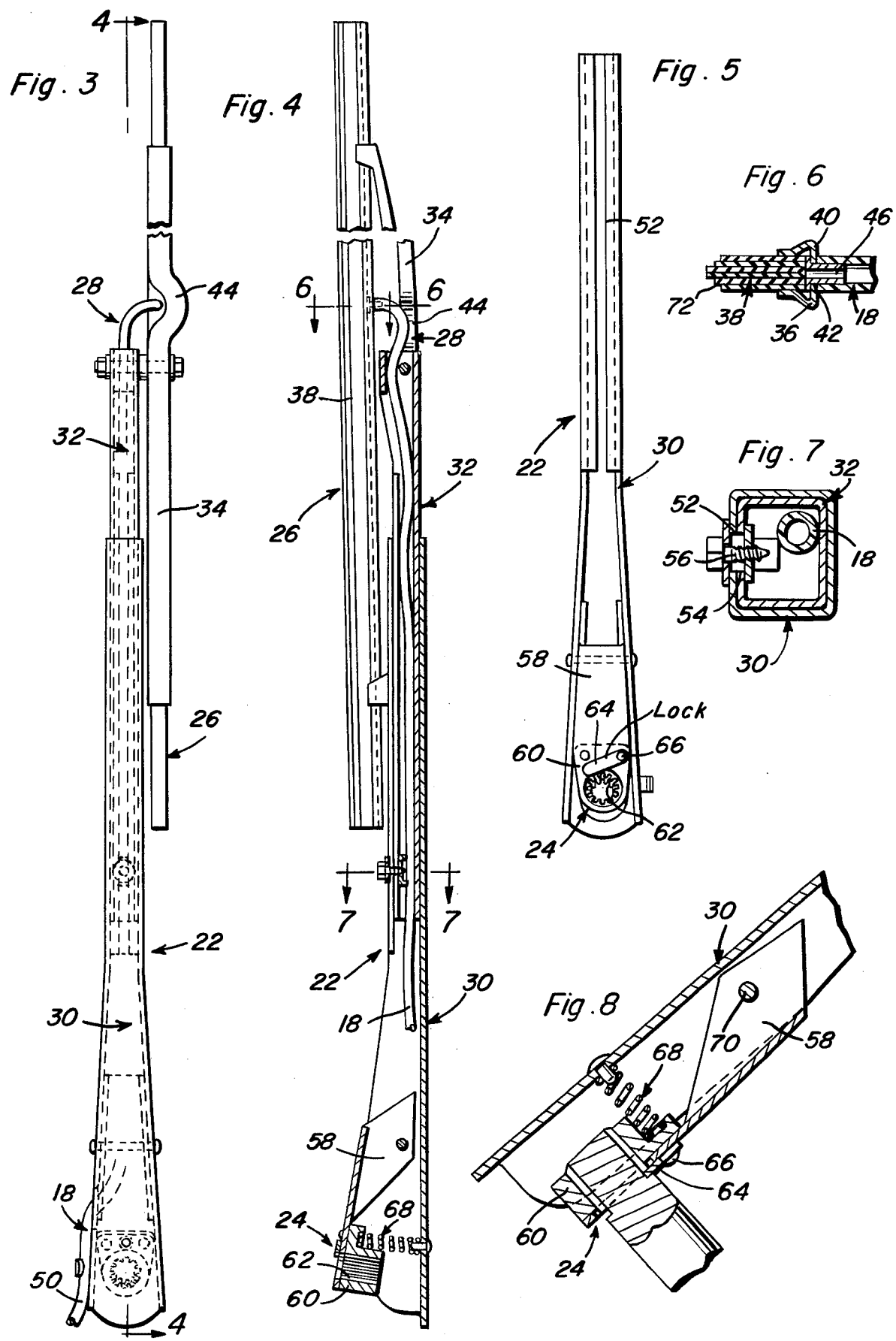

WIPER FOR WINDSHIELDS

BACKGROUND OF THE INVENTION

1. Field of the Invention

This invention relates generally to new and useful improvements in vehicle accessories, and more particularly to an improved windshield wiper assembly.

2. Description of the Prior Art

A vehicular windshield wiper serves a dual function. When it is raining quite hard, the windshield wiper tends to reduce the coating of water on the windshield to a minimum to permit clear vision. Also, when it is raining only lightly the windshield wiper serves to remove dirty water, and the like, from the windshield and thus effect a cleaning operation. After the rain has stopped, however, or during a very light drizzle sufficient road water will be thrown up onto the windshield to obscure the vision of a driver of a vehicle, and at the same time moisture on the windshield is insufficient for the wiper to effect a proper cleaning operation. In order to overcome this situation, there have been devised the well known windshield washing systems. These washers normally spray a direct stream of water onto a windshield, after which the wipers are used to clean the windshield by using the aforementioned sprayed water. A difficulty encountered with many prior art washer systems is that the sprays of water are not too well directed, and as a result a large percentage of the water is actually wasted.

In view of the above, therefore, it was an object of the windshield wiper assembly set out in my U.S. Pat. No. 2,925,617, issued Feb. 23, 1960, to provide a windshield wiper in which the washing fluid was applied directly to a windshield by passing the fluid through the wiper blade itself so as to prevent unnecessary wasting of the water or other cleaning fluid.

SUMMARY OF THE INVENTION

It is an object of the present invention to provide an improved wiper blade assembly construction for facilitating the distribution of a washing fluid through the wiper blade.

It is another object of the present invention to provide a windshield wiper assembly capable of fitting the curved windshields and recessed wiper installations typical of recently produced automobiles, and the like.

These and other objects are achieved according to the present invention by providing a windshield wiper assembly having: an arm assembly; means provided on the arm for mounting same on a wiper arm support head; a blade assembly mounted on the arm assembly; and means associated with the arm assembly for supplying a fluid to the blade assembly.

The arm assembly preferably includes an arm and an arm extension telescoped together to form a resulting wiper arm of adjustable length.

A preferred blade assembly according to the present invention has a bridge attached to the arm, or more specifically the arm extension, at a point thereof spaced from the associated means for mounting the arm on a vehicle. A longitudinally extending base is removably connected to the bridge, and a longitudinal blade is connected to the base. The blade is arranged extending longitudinally with its associated base, and is provided with a groove arranged for forming a gutter in cooperation with the base. An aperture is provided in the base substantially mid-way in the longitudinal extent thereof for permitting communication with the groove, while at least one passage is arranged through the blade for permitting communication between the groove and a blade surface. A jog is arranged in the bridge for circumventing the aperture in the base and facilitating attachment of a hose, and the like, to the aperture for supplying a washing fluid to the groove.

The hose is advantageously arranged in the hollow interior of the arm and arm extension, with one end of the hose being received in the aperture in the blade base, and the other hose end arranged passing through an opening provided in the arm adjacent the arm's point of attachment to a vehicle.

An advantageous feature according to the present invention is the provision of a block mounted on the arm at a point spaced from the arm extension and blade assembly and provided with a bore arranged for receiving a support head. A lever is pivotally mounted adjacent a one end thereof to the block and is arranged for selectively contacting a support head received in the bore and retaining the arm on the support head.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary, front elevational view showing a windshield wiper assembly according to the present invention.

FIG. 4 is a fragmentary, sectional view taken generally along the line 4—4 of FIG. 3.

FIG. 5 is a rear elevational view showing a portion of an arm assembly for a windshield wiper assembly according to the present invention.

FIG. 6 is a fragmentary, sectional view taken generally along the line 6—6 of FIG. 4.

FIG. 7 is a sectional view, with some parts omitted, taken generally along the line 7—7 of FIG. 4.

FIG. 8 is a fragmentary, longitudinal sectional view showing in detail the attachment of a windshield wiper assembly according to the present invention to the support head of a vehicle.

DESCRIPTION OF THE PREFERRED EMBODIMENTS

Figure 1:
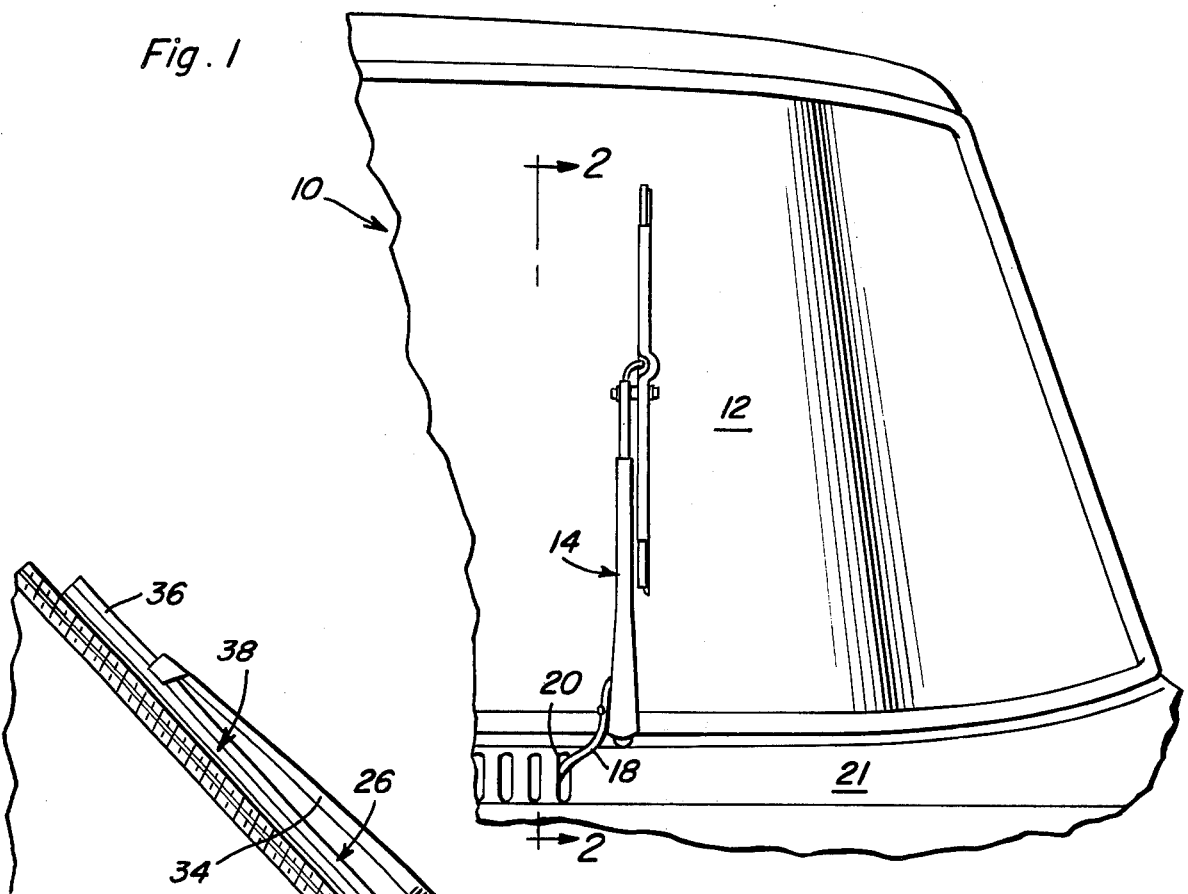
FIG. 1 is a fragmentary, front elevational view showing a windshield wiper assembly according to the present invention mounted on a motor vehicle.
Figure 2:
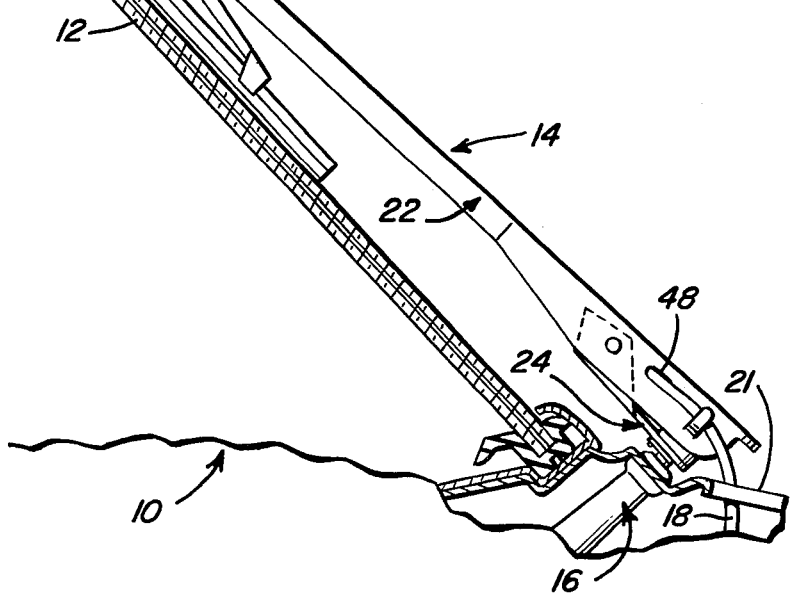
FIG. 2 is a fragmentary, sectional view taken generally along the line 2—2 of FIG. 1, but drawn to a larger scale.

Referring now more particularly to FIGS. 1 and 2 of the drawings, a conventional vehicle 10 is shown as provided with a conventional windshield 12 retained in the conventional manner. A wiper assembly 14 according to the present invention is mounted on a conventional support head 16 which are generally standard equipment on motor vehicles. A hose 18 runs from a suitable, known fluid source (not shown) arranged under the hood of the vehicle. As illustrated, the hose 18 passes through a vent 20 in cowl 21 of the vehicle, although it is to be understood that other arrangements, such as a fitting on the cowl, may be used to connect hose 18 to a fluid source.

Referring now to FIGS. 3 to 5 of the drawings, an arm assembly 22 of wiper assembly 14 is provided with an arrangement 24 for mounting assembly 22 on, for example, wiper arm support head 16. A blade assembly 26 is mounted on arm assembly 22 in a manner to be described below, while an arrangement 28 is associated with arm assembly 22 for supplying a fluid, such as water, to blade assembly 26.

Arm assembly 22 includes an arm 30 and an arm extension 32, with the latter being adjustably telescoped into the arm 30. Both arm 30 and arm extension 32 are preferably constructed so as to provide a passage through arm assembly 22 for a purpose to be set out below.

A bridge 34 is attached to arm assembly 22, specifically to arm extension 32 at an end thereof spaced furthest from arm 30 and arrangement 24. Blade assembly 26 includes a longitudinally extending base 36 and a longitudinal blade 38 connected to base 36 as by being inserted into the U-shaped channel (FIG. 6) formed by the base 36. Blade 38 is, as mentioned above, arranged extending longitudinally with base 36, and is provided with a groove 40 also arranged extending longitudinally for forming a gutter in cooperation with the adjacent surface of base 36. An aperture 42 is provided in base 36 substantially mid-way in the longitudinal extent thereof, and is arranged for permitting communication with groove 40. As can be appreciated from the drawings, base 36 permits the removable connection of 34 assembly 26 to bridge 34 in that bridge 343 is arranged extending longitudinally along and has spaced end portions connected to base 36. Further, bridge 34 is provided with a jog arranged for circumventing aperture 42. The purpose of this jog 44 will become apparent below.

As mentioned above, arm 30 and arm extension 32 are hollow, in fact being constructed from sheet metal and the like in the form of tubes having rectangular cross sections, and arrangement 28 includes hose 18 being arranged in arm 30 and arm extension 32. That is, hose 18 passes through the hollow passage defined by the arm assembly 22 formed by arm 30 and arm extension 32. An end fitting 46 is provided on a one end of hose 18, the latter having a pair of spaced ends, and is arranged for being received in aperture 42 for connecting hose 18 to blade assembly 26 and furnishing a cleaning fluid to groove 40. As can now be appreciated from the above description and from the drawings, jog 44 in bridge 34 facilitates placement of fitting 46 in aperture 42. Arm 30 is provided with an 48 48 (FIG. 2) adjacent arrangement 24, and the other end 50 of the pair of spaced ends of hose 18 is arranged passing through this opening 38 and is connectible to an associated fluid supply fitting (not shown). Such fittings are conventionally provided on motor vehicles, and the like.

FIGS. 5 and 7 best illustrate the construction of arm assembly 22 as a pair of hollow tubes having rectangular cross sections. Specifically, arm 30 and arm extension 32 are each provided with a respective slot 52 and 54 which are arranged mating with one another to form an opening arranged for receiving a conventional fastener assembly 56 which will prevent displacement of the arm and arm extension 32 relative to one another. Although only one fastener assembly 56 is shown in the drawings, it is to be understood that additional fasteners may be employed as desired.

Referring now to FIGS. 5 and 8 of the drawings, a bracket 58 is connected to one of the flared side wall portions at the lower end of arm 30 as by a rivet, and the like. A block 60 is mounted on bracket 58, and a bore 60, preferably splined as illustrated, is provided in block 60 for receiving a support head 16. Mounted on block 60 is a lever 64 advantageously supported as by a pin 66 arranged in an opening adjacent a one end of lever 64 for permitting pivotal movement of the lever toward and away from the support head 16. In this manner, lever 64 may selectively contact a support head 60 received in bore 62 and retain arm 30 on the support head. An annular recess may be conventionally provided in the support head for receiving lever 64 and facilitating the retaining action of the lever.

A, for example, coiled spring 68 is advantageously arranged connected to and extending between the web portion of arm 30 and a socket-forming flange of block 60 for biasing arm 30 about its pivotal connection at 70 to bracket 58 for biasing blade assembly 26 against a windshield 12.

Groove 40 may extend the length of blade 38, except, for example, four inches from the end of blade 38 which will be arranged at the bottom or closest to arrangement 24 and one inch from the top end or end of blade 38 spaced from the aforementioned end. One or more passages 72 (FIG. 6) may be provided in blade 38 for permitting egress of the cleaning fluid from the gutter formed by groove 40 to a windshield 12 to facilitate cleaning of the windshield as desired. Preferably, a plurality of passages 72 are spaced along the longitudinal extent of blade 38 in a predetermined manner (not shown).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A windshield wiper assembly, comprising, in combination:
    a. an arm assembly;
    b. means provided on the arm for mounting same on a wiper arm support head;
    c. a blade assembly mounted on said arm assembly; and
    d. means associated with the arm assembly for supplying a fluid to the blade assembly, the blade assembly including a bridge attached to the arm assembly at a point thereof spaced from the means for mounting, a longitudinally extending base connected to the bridge, and a longitudinal blade connected to the base, the blade being arranged extending longitudinally with the base and provided with a longitudinal groove arranged adjacent the base for forming a gutter in cooperation with the base, and an aperture provided in the base substantially midway in the longitudinal extent thereof and arranged for permitting communication with the groove, a plurality of passages provided in the blade and arranged spaced along the longitudinal extent of the blade for permitting a fluid to pass to a windshield from the gutter formed by the groove and base, and the bridge extending longitudinally along and having spaced end portions connected to the base, with the bridge provided with a jog arranged for circumventing the aperture in the base and facilitating placement of a portion of the means for supplying the fluid to the blade assembly.

2. A structure as defined in claim 1, wherein the arm assembly includes:
 i. an arm; and
 ii. an arm extension adjustably telescoped on the arm.

3. A structure as defined in claim 2, wherein the arm and arm extension are hollow, and the means for supplying includes a hose arranged in the arm and arm extension, and the hose having a one end of a pair of spaced ends received in the aperture in the base of the blade assembly, the jog in the bridge facilitating placement of the one end in the aperture.

4. A structure as defined in claim 3, wherein the arm is provided with an opening adjacent the means for mounting, and the other end of the pair of spaced ends is arranged passing through the opening.

5. A structure as defined in claim 4, wherein the means for mounting includes:
 i. a block mounted on the arm;
 ii. a bore provided in the block and arranged for receiving a support head; and
 iii. a lever pivotally mounted to the block at a point adjacent one end of the lever and arranged for selectively contacting a support head received in the bore and retaining the arm on the support head.

6. A structure as defined in claim 1, wherein the means for mounting includes:
 i. a block mounted on the arm;
 ii. a bore provided in the block and arranged for receiving a support head; and
 iii. a lever pivotally mounted to the block at a point adjacent one end of the lever and arranged for selectively contacting a support head received in the bore and retaining the arm on the support head.

7. A blade assembly for a windshield wiper assembly, comprising a longitudinally extending bridge having spaced end portions connectible to a wiper blade, the bridge provided with a jog in substantially the midpoint of the longitudinal extent thereof, a longitudinally extending base connected to the bridge, and a longitudinal blade connected to the base, the blade being arranged extending longitudinally with the base and provided with a groove arranged for forming a gutter in cooperation with the base, at least one passage provided in the blade and arranged for permitting egress of a fluid from the gutter formed partially by the groove, and an aperture provided in the base substantially midway in the longitudinal extent thereof and arranged for permitting communication with the groove, the jog in the bridge facilitating connection of a supply hose to the aperture.

* * * * *